Patented Apr. 4, 1950

2,502,422

UNITED STATES PATENT OFFICE 2,502,422

2′ - KETO - 3,4 - IMIDAZOLIDO - 2 - ω - SUBSTITUTED ALKYL THIOPHENES AND PROCESS FOR OBTAINING SAME

Lee C. Cheney, Detroit, Mich., assignor to Parke, Davis & Company, Detroit, Mich., a corporation of Michigan No Drawing. Application February 9, 1945, Serial No. 577,155

8 Claims. (Cl. 260—309)

This invention relates to a method for the synthesis of the recently discovered biologically active compound known as biotin and certain analogs thereof containing the same bicyclic ring system as biotin. The invention also includes a new class of biotin-like compounds not previously described which can be made in accordance with the new method of the present invention.

The process of this invention consists in catalytically reducing the two ring double bonds of a compound of the general formula,

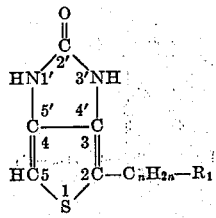

where $n=1$ to 8 and the alkylene residue, $$(-C_nH_{2n}-)$$

may be straight or branched, and where $R_1$ is a radical of the class —COOH, —COOM′, —COOR′, alkoxy, aralkoxy and aryloxy, R′ being lower alkyl and M representing a salt-forming basic group or metal such as sodium or other alkali metal, alkaline earth metal, ammonium or substituted ammonium.

The above formulated new class of doubly unsaturated compounds are 2′-keto-3,4-imidazolido-2-ω-substituted alkylthiophenes. Their preparation is described in copending application of Lee C. Cheney and John Robert Piening, Serial No. 569,640, filed December 23, 1944, now U. S. Patent 2,466,004.

I have discovered that biotin type compounds can be prepared by catalytically hydrogenating the above formulated starting materials at their carbon-to-carbon double bonds by reaction with hydrogen at temperatures between about 100° C. and 300° C. and under hydrogen pressures between about 50 and 750 atmospheres in the presence of a sulfide catalyst from the class consisting of sulfides of molybdenum, nickel, cobalt, tin and iron.

The hydrogenation can be carried out on the liquid, solid or vaporized forms of the starting materials and in the presence of the sulfide catalyst in the form of relatively large masses or in comminuted or powdered form, either in suspension in a substantially dry inert organic solvent or associated with catalyst carrier means such as alumina, asbestos or like inert solid.

The following examples serve to illustrate the invention without limiting it to the particular details of time, temperature, materials and other conditions specifically described therein.

Example 1

A mixture of 2.40 g. (0.01 mole) of 2,3,4,5-tetradehydrobiotin, 500 ml. of purified dioxane and 80 g. of pulverized molybdenum trisulfide-alumina gel catalyst is rocked in an Adkins' hydrogenator and heated from 200° C. to 210° C. for five hours under a hydrogen pressure of 2700 lbs. per square inch. The cooled bomb is opened and the catalyst is removed by filtration. The bomb and catalyst are washed with 500 ml. of warm absolute alcohol. Combined filtrate and washings are distilled under reduced pressure. The brown residue contains d,l-biotin and its stereoisomers. A sample of the product stimulates the growth of L. arabinosus, a microbiological test which shows the presence of biotin or biotin-active compounds. By fractional crystallization of the brown residue from water or aqueous or anhydrous organic solvents, such as lower aliphatic alcohols, the purified d,l-biotin, M. P. 232° C., is isolated.

Example 2

A mixture of 2.74 g. (0.01 mole) of 2′-keto-3,4-imidazolido-2-γ-phenoxypropylthiophene, 600 ml. of absolute alcohol and 100 g. of pulverized molybdenum trisulfide-alumina gel catalyst is rocked and heated in an Adkins' hydrogenator at a temperature of 190–200° C. and under a hydrogen pressure of 2600 lbs. per square inch for a period of twenty-four hours. After cooling, the bomb is opened and the catalyst is removed by filtration through a fritted glass funnel. The bomb and the catalyst are washed with a total of 400 ml. of warm absolute alcohol in several portions. Combined filtrate and washings are distilled to dryness under reduced pressure. The light-brown solid residue consists mainly of 2′-keto - 3,4 - imidazolido - 2 - γ - cyclohexyloxypropyltetrahydrothiophene. This product can be obtained in the form of pure white crystals, by recrystallizing it several times from aqueous or anhydrous organic solvents such as methyl alcohol, ethyl alcohol or other lower aliphatic alcohol. It is useful as an intermediate for the preparation of biotin.

Although ethyl alcohol and dioxane are used as solvents for the bicyclic sulfur compounds in the above examples, any other monohydroxy or polyhydroxy alcohol or glycol such as methyl alcohol, propyl alcohol, isopropyl alcohol, ethylene glycol, propylene glycol and relatively low molecular weight alcohol ethers, such as ethylene glycol monomethyl ether or ethylene or propylene glycol monoethyl ether, may be used as a reaction medium.

The reaction medium is preferably kept near neutrality, although the process gives the desired hydrogenation even when somewhat alkaline or acidic conditions are used.

I have found that sulfides of molybdenum, such as molybdenum trisulfide or disulfide, are especially good catalysts for the process of the present invention. However, the various sulfides of iron, cobalt, nickel and tin also give satisfactory results. In view of the known great instability of the sulfide linkage of the organic compounds utilized in this invention, it was surprising to find that any of the catalysts mentioned would permit of hydrogenation of the carbon-to-carbon double bonds without completely disrupting the carbon-sulfur heterocyclic ring.

Instead of hydrogenating the thiophene valeric acid or 2-γ-phenoxypropylthiophene compounds as described in the examples, any of the other compounds under the general formula given above can be used whereby the tetrahydrogenated compounds are obtained of formula,

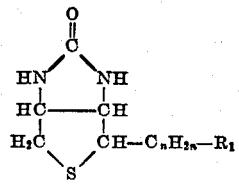

the groups —$C_nH_{2n}$— and —$R_1$ having the significance already given. Thus, one could use the 2'-keto-3,4-imidazolido - 2 - γ - benzyloxypropylthiophene described under Example 3 of said copending application, Serial No. 569,640, whereby the corresponding tetrahydrogenated compound of formula,

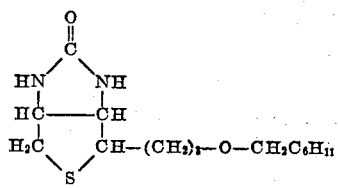

is obtained. The latter compound, as well as the compound of Example 2 above, is a member of the new class of compounds of the formula,

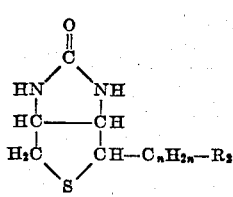

where $n$ is an integer from 1 to 8 inclusive and the alkylene residue (—$C_nH_{2n}$—) is straight or branched chain and where $R_2$ is a member of the class alkoxy, cycloalkyl substituted alkoxy and cycloalkoxy radicals. The $R_2$ group of these compounds differs from the carboxyl or related groups (—COOM and —COOR') present in biotin. These new compounds are valuable as biotin-like compounds and also serve as intermediates for preparation of biotin itself. Biotin prepared as described in Example 1 has the formula,

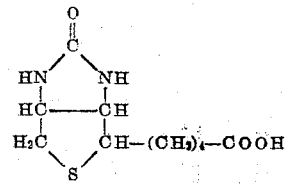

whereas the new compound of Example 2 has the formula,

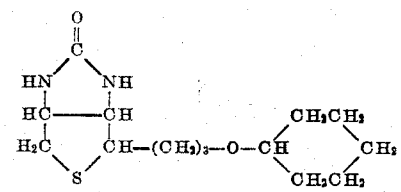

I claim:

1. Process for the preparation of 2'-keto-3,4-imidazolido-2-ω-substituted alkyl thiophenes which comprises hydrogenating, in the presence of a catalyst of the class consisting of sulfides of molybdenum, nickel, cobalt, tin and iron, a compound of formula,

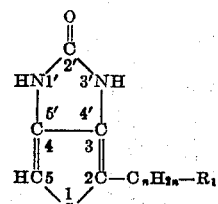

where $n=1$ to 8 and (—$C_nH_{2n}$—) is an alkylene residue, and where $R_1$ is a radical of the class consisting of —COOH, —COO(alkali metal), —COO(alkaline earth metal), —COONH$_4$, —COO (lower alkyl), alkoxy, aralkoxy and aryloxy.

2. Process for the preparation of 2'-keto-3,4-imidazolido-2-ω-substituted alkyl thiophenes which comprises hydrogenating, in the presence of a catalyst of the class consisting of sulfides of molybdenum, nickel, cobalt, tin and iron, a compound of formula,

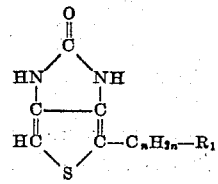

where $n=1$ to 8 and (—$C_nH_{2n}$—) is an alkylene residue, and where $R_1$ is a radical of the class consisting of —COOH, —COO(alkali metal), —COO(alkaline earth metal), —COONH$_4$, —COO (lower alkyl), alkoxy, aralkoxy and aryloxy, said hydrogenation being carried out in presence of a solvent of the class consisting of dioxane, lower monohydroxy and polyhydroxy alcohols and their low molecular weight alcohol ethers under substantially neutral reaction conditions.

3. Process for the preparation of 2'-keto-3,4-imidazolido - 2 - ω-substituted alkyl thiophenes which comprises hydrogenating, in the presence of a sulfide of molybdenum, a compound of formula,

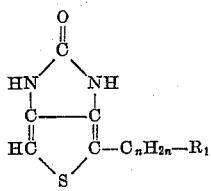

where $n=1$ to 8 and ($-C_nH_{2n}-$), is an alkylene residue, and where $R_1$ is a radical of the class consisting of —COOH, —COO(alkali metal), —COO(alkaline earth metal), —COONH$_4$, —COO (lower alkyl), alkoxy, aralkoxy and aryloxy.

4. Process for the preparation of 2'-keto-3,4-imidazolido-2-(ω-carboxy-substituted)-n - butyl-thiophene which comprises hydrogenating, in the presence of a sulfide of the class consisting of the sulfides of molybdenum, nickel, cobalt, tin and iron, the ring double bonds of a compound of formula,

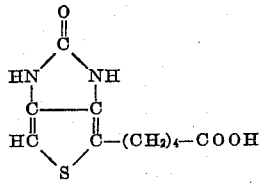

5. Process for the preparation of 2'-keto-3,4-imidazolido-2-(ω-carboxy-substituted)-n - butyl-thiophene which comprises hydrogenating, in the presence of a sulfide of molybdenum, the ring double bonds of a compound of formula,

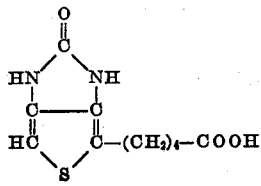

6. Compounds of the formula,

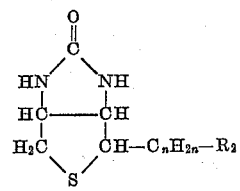

where $R_2$ is a member of the class consisting of alkoxy, cycloalkyl substituted alkoxy and cycloalkoxy radicals and $n$ is an integer from 1 to 8 inclusive.

7. A compound of the formula,

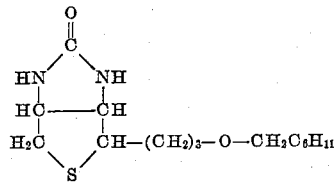

8. A compound of the formula,

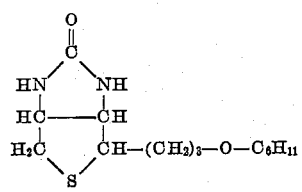

LEE C. CHENEY.

No references cited.